June 25, 1957   E. A. SCHUMACHER ET AL   2,797,254
GAS PERMEABLE MEMBRANE FOR AIR DEPOLARIZED CELL
Filed Feb. 10, 1954

INVENTORS
ERWIN A. SCHUMACHER
ROSWELL J. BENNETT
PAUL S. BROOKS
BY
ATTORNEY

United States Patent Office 2,797,254
Patented June 25, 1957

2,797,254

GAS PERMEABLE MEMBRANE FOR AIR DEPOLARIZED CELL

Erwin A. Schumacher, Parma, Roswell J. Bennett, Lakewood, and Paul S. Brooks, Brecksville, Ohio, assignors to Union Carbide and Carbon Corporation, a corporation of New York Application February 10, 1954, Serial No. 409,434

5 Claims. (Cl. 136—177)

This invention relates to improvements in primary cells of the air-depolarized cathode type, and more particularly concerns gas permeable membrane covers for air-depolarized cells.

In the conventional primary battery of the air-depolarized cell type, as for example one comprising an anode of zinc, a porous, active carbon cathode and an electrolytic solution therebetween, the oxygen of the ambient atmosphere is utilized by the carbon cathode of various cell types in the following manner. In cell containers of the type illustrated in the patent to P. A. Marsal et al., 2,597,116, issued May 20, 1952, suitably located ports or openings may be provided in the cell walls to allow air to contact exposed portions of the carbon cathode. In other cell constructions, for example conventional air-depolarized cells such as those used for railway signal service, the entire upper surface of the carbon cathode may be directly exposed to the atmosphere, or the atmospheric air may traverse an inner chamber in the cell to reach the cathode breathing surfaces. In all instances, the carbon sorbs the oxygen, and through a process of diffusion and migration, makes it available in active form at the electrode-electrolyte interface. The depolarization or cathodic reduction reaction then converts the oxygen into a peroxy compound, which under ordinary conditions of cell use is quickly dissipated.

The functioning of the active carbon cathodes may be impaired in a number of ways. If the humidity of the atmosphere is relatively high, some of the contained moisture in the air may be retained in the carbon pores, thereby reducing the further sorption of atmospheric oxygen. Conversely, if the humidity of the ambient air is low, moisture will escape from the cell. Where the cell is of the so-called "dry" type, any considerable moisture loss will cause electrolyte shrinkage and thus limit the useful life of the cell.

For these and other reasons, it is important that the moisture gain or loss of an air-depolarized cell be reduced without obstructing the passage of atmospheric oxyen into the cell to fulfill the depolarization requirements thereof.

It is, therefore, an important object of the present invention to reduce the transfer into, or the escape of moisture from, air-depolarized cells.

Another object of the invention is to provide in primary cells of the air-depolarized type, means for occluding oxygen of the air, to promote depolarization of the cathode.

Still another object of the present invention is to reduce the transfer of moisture into or out of cells of the air-depolarized type, and at the same time to occlude sufficient oxygen from the air so as to efficiently and effectively depolarize the cell.

Other objects, featuers and advantages of the present invention will be apparent from the following detailed description of certain embodiments thereof taken in conjunction with the accompanying drawing in which.

Figure 1:
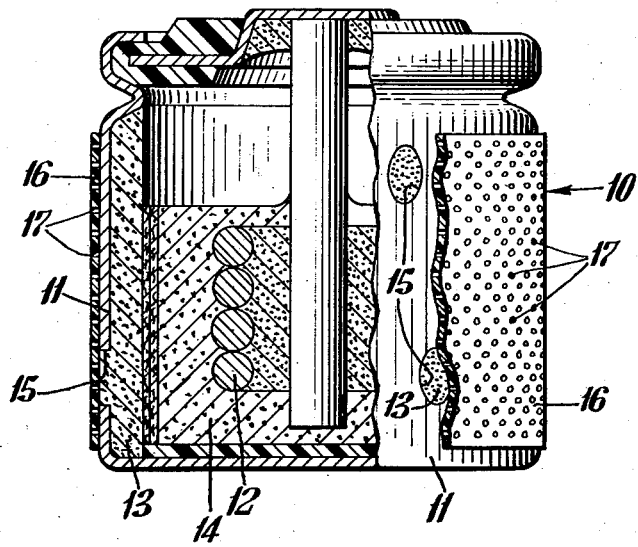
Fig. 1 is a front elevational view of the apparatus of the invention, partly in section with outer members partly broken away to show underlying parts.

In its broadest aspects, the principles and features of the present invention are involved in the reduction of moisture transmission through the porous carbon cathode of an air-depolarized cell, and the maintenance of a flow of oxygen from the air into the interior of the cell for the purpose of depolarizing the carbon electrode. Briefly, referring to Fig. 1, a conventional "dry" type air-depolarized cell 10 may comprise an impervious shell casing 11 having therein an anode 12, such as amalgamated zinc, a carbon cathode 13, and some form of immobilized electrolyte solution 14, such as sodium hydroxide.

Vent openings 15 are provided in the casing 11 to allow the cell to breathe. Specifically, these openings permit access of atmospheric air into the cell. The oxygen of the air is occluded by the carbon cathode 13, and is thereafter utilized during cell discharge to perform its depolarization function at the carbon cathode-electrolyte interface.

In the normal course of operation, a number of factors will tend to impair the functioning of the cell. One of the most serious of these concerns a change in the moisture content of the cell. This may be manifested in several ways. First, water from the electrolyte solution may evaporate due to low humidity conditions in the atmosphere, causing dessication in the cell. Second, the atmospheric humidity may be so high as to cause condensation of water vapor in the pores of the activated carbon cathode. Or third, a high concentration of water vapor in the carbon may lead to vapor diffusion into the electrolyte, causing dilution of the electrolyte, and, as a result of the consequent increase in the electrolyte volume, create a leakage hazard in the cell. In each instance, the change is moisture content of the cell will seriously affect its useful life.

One of the difficulties involved in reducing the movement of moisture in a cell of the air-depolarized type lies in the fact that a reduction in the accessibility of moisture to the cell is usually accompanied by a corresponding reduction in the availability of depolarizing air. Naturally a reduction in the flow of air will correspondingly limit the rate of discharge of the battery.

To the end that the above objects may be achieved, and as a feature of the present invention, means are provided for reducing the movement of moisture from the atmosphere to the active carbon electrode, or for retarding its movement from the cell while maintaining a high rate of air transfer from the atmosphere to the active carbon, and allowing efficient conduction of occluded oxygen to the electrolyte interface without altering the moisture content of the cell. According to this invention, it is proposed to cover the breathing surfaces or vents or openings leading to the cathode of an air-depolarized cell with a permeable diaphragm, or cover 16 having a number of apertures 17 of restricted size and area, so that the air and moisture transmission into and out of the cell is reduced. While the restriction of both the moisture and air flow in controlled by varying the permeability of the diaphragm, or the size and spacing of the apertures in the cover, the degree to which the air flow rate is affected upon the diminishment of the flow area apparently is not as great as, and appears to be substantially less than, the moisture flow rate. Any long-wearing material which will retard the flow of moisture and gas vapors may be used as a diaphragm. For instance, a material such as permeable black vinyl tape, may be employed as a membrane cover for the breather openings of the cell.

The total cross-sectional area of the perforations in the diaphragm determines the air flow passing therethrough, and consequently, the depolarization effectiveness of the cathode. The effective rate of discharge of the cell may be conveniently varied by providing diaphragms with perforations of different sizes and numbers. Thus, in air depolarized cells of the type illustrated in the aforesaid patent to P. A. Marsal et al., 2,597,116, openings having a total area as small as .012 square inch have been found sufficient to support a 50 milliampere drain. For smaller currents, proportionately smaller openings may be employed.

Figures 2, 3:
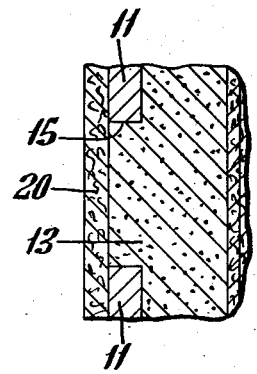
Fig. 2 is an enlarged sectional view of a portion of the apparatus shown in Fig. 1, but showing a modification thereof.
Fig. 3 is an enlarged sectional view of a portion of the apparatus shown in Fig. 1, but showing another modification thereof.

Measurable improvement may be effected with perforated plastic covers. It has been shown that openings as small as .01" in diameter (.00008 square inch) in an otherwise impermeable membrane, will permit sufficient oxygen to diffuse therethrough to support current drains up to 0.5 and 1.0 milliampere.

Where low current drain service and use extending over long periods of time are in demand, a gas permeable membrane 20, Fig. 2, may be employed in lieu of the perforated cover. For instance, paper membranes, especially water-proofed paper covers, may be used to good advantage. Water-proofed paper covers have reduced vapor transmission as much as 50% during discharge at 95° F., while allowing air to diffuse through the minute openings. Moreover, membranes having a very low order of permeability can, under certain circumstances, pass sufficient quantities of oxygen to give significant current effects. This feature may be used advantageously for the construction of very low drain cells.

A similar reduction in the movement of water vapor through the breather ports of air depolarized cells may be effected by combining the features of gas permeable membranes and perforated membranes. Thus, referring to Fig. 3, desiccation in a cell may be minimized by placing a water-proofed porous paper 22 over the breather ports of the cell, and superimposing on the paper an impervious cover 23 of suitable thickness, having openings 24 to admit air. With such composite cover, the range of operating voltage at any particular drain will be determined by the dimensions of the openings 24.

For optimum operation of the cell, it is essential that the air passing through the membrane or restrictive cover should have maximum distribution over the cathode-atmosphere interface, a condition promoted by a multiplicity of openings in the cathode backing member rather than by a single perforation having the same total area.

As an example of the effect of perforations in an air barrier on the performance of an air-depolarized cell of the P. A. Marsal et al. type, U. S. Patent 2,597,116, operating under a 100 ohm load, the following discharge voltage results have been obtained.

| Material | Unperforated | 0.00025 square inch Total Perforation Area (two 0.013" diameter holes per cell) | .001 square inch Total Perforation Area (two 0.025" diameter holes per cell) | 0.002 square inch Total Perforation Area (four .025" diameter holes per cell) |
| --- | --- | --- | --- | --- |
| | V. | V. | V. | V. |
| Black vinyl tape | 0.5 | 0.9 | 0.90 | 1.20 |
| Cellulose Mending tape (clear) | | 1.15 | 1.23 | 1.24 |
| Cloth-back electrician tape | 1.24 | 1.24 | 1.24 | 1.24 |

From the above it is easily seen that, assuming optimum discharge voltages, the current drains of air-depolarized cells vary in the same sense as the size and number of the openings in the material covering the breather ports of the cell. That is, as the size and number of the openings is diminished or increased, the discharge voltage and current drain are correspondingly affected. For cells employing semi-permeable plastic membranes over the cell ports, the diffusion of air through such membranes, while of a very small order, is sufficient to support drains as low as 0.5 milliampere. In any case, no matter which specific material is employed as a covering over the breather ports of the cell, the water vapor transmission through the carbon electrode thereof is extremely small, so that longer cell life is assured.

From the above description it will, therefore, be understood that according to this invention, film materials or perforated films or both are provided over the breather ports of air-depolarized cells for impeding water vapor transmission in both directions through such cells, while maintaining depolarization action therewithin, all to the end that the cell life may be extended.

It is to be understood that variations and modifications may be effected without departing from the novel concepts of the present invention.

We claim:

1. In an air-depolarized cell including an impervious outer cell wall, an active, porous carbon cathode and an anode within said cell, an electrolyte solution between said anode and said cathode, and vent openings provided in said cell wall for the passage of air to said porous cathode, the improvement comprising a film mounted on the cell over said vent openings, said film having air transmissibility qualities which substantially impede the flow of moisture and water vapor, and variable means for controlling the discharge voltage and current drain of the cell.

2. In an air-depolarized cell including an impervious outer cell wall, an active, porous carbon cathode and an anode within said cell, an electrolyte solution between said anode and said cathode, and vent openings provided in said cell wall for the passage of air to said porous cathode, the improvement comprising a film mounted on the cell over said vent openings, said film having air transmissibility qualities which substantially obstruct the passage of moisture and water vapor, and means for controlling the discharge voltage and current drain of the cell, said means constituting a plurality of perforations in said film in proportion to the discharge voltage and current drain required from said cell.

3. In an air-depolarized cell having breather ports for the passage of air into the interior of the cell, a composite material covering said ports, said material comprising an air-permeable, moisture-impermeable membrane covering said breather ports, and an apertured membrane super-imposed on said first mentioned membrane for controlling the flow of air admitted therethrough.

4. In an air-depolarized cell having breather ports for the passage of air into the interior of the cell, the improvement comprising a porous water-proofed paper membrane covering said breather ports, and an apertured impervious cover superimposed on said paper membrane.

5. A composite covering for air depolarized cells comprising an inner film and an outer film, said outer film having a plurality of openings therein for controlling the passage of air therethrough, and said inner film being permeable to air and substantially less permeable to the water vapor in the air.

References Cited in the file of this patent

UNITED STATES PATENTS 524,229    Walker et al.    Aug. 7, 1894

(Other references on following page)

UNITED STATES PATENTS

| | | |
|---|---|---|
| 1,969,630 | Sprague et al. | Aug. 7, 1934 |
| 2,505,014 | Terlizzi et al. | Apr. 25, 1950 |
| 2,571,927 | Neumann et al. | Oct. 6, 1951 |
| 2,572,918 | Fisher et al. | Oct. 30, 1951 |
| 2,597,116 | Marsal et al. | May 20, 1952 |
| 2,597,119 | Schumacher et al. | May 20, 1952 |
| 2,632,032 | Winckler | Mar. 17, 1953 |
| 2,641,623 | Winckler et al. | June 9, 1953 |

FOREIGN PATENTS

| | | |
|---|---|---|
| 721,666 | France | Dec. 22, 1931 |
| 11,399 | Austria | Feb. 17, 1933 |
| 487,294 | Great Britain | June 17, 1938 |
| 879,517 | France | Nov. 19, 1942 |